United States Patent Office 3,519,630
Patented July 7, 1970

3,519,630
ANTIBACTERIAL AND ANTIFUNGAL
TREATMENT WITH SULFONES
Ivan C. Popoff, Ambler, Bernard Buchholz, Blue Bell, and Harold J. Miller, Newtown Square, Pa., assignors to Pennsalt Chemicals Corporation, Philadelphia, Pa., a corporation of Pennsylvania
No Drawing. Continuation-in-part of application Ser. No. 636,026, May 4, 1967. This application Feb. 6, 1969, Ser. No. 797,255
Int. Cl. A01n 9/12, 9/22
U.S. Cl. 424—270
15 Claims

ABSTRACT OF THE DISCLOSURE

Process of controlling bacteria and fungi with compounds of the structure:

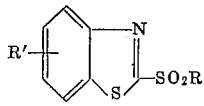

where R is an alkyl group containing from 1 to 12 carbon atoms and R' is hydrogen, nitro, amino, halogen, perfluoroalkyl, or mono- and dialkylamino, R' being located in the 5 or 6 position.

---

This application is a continuation-in-part of Ser. No. 636,026 filed May 4, 1967 which is a continuation-in-part of Ser. No. 553,615, filed May 31, 1966 both abandoned.

This invention relates to anti-bacterial and antifungal compositions and to the process of using them, and is particularly concerned with the use as the active agent of an alkyl benzothiazolyl sulfone having the structure

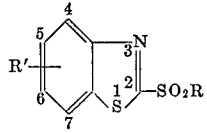

where R is an alkyl group (including cycloalkyl) containing from 1 to 12 carbon atoms and R' is a member selected from the group consisting of hydrogen, nitro, amino, halogen, perfluoro lower alkyl, and mono- and dialkylamino, (preferably, in the latter case, a group of the structure

where $R_1$ and $R_2$ are alkyl groups containing from one to six carbon atoms) and with the proviso that the R' substituent be located in the 5 or 6 position.

The above described benzothiazolyl sulfones are prepared from the corresponding 2-mercaptobenzothiazoles which are S-alkylated and oxidized to the sulfone (Wagner and Zook, "Synthetic Organic Chemistry," John Wiley & Sons, Inc. 1953, pages 787 and 801). Alternatively, substituent groups may be introduced on the benzene ring after formation of the sulfone. The compounds are used in accordance with the usual procedures where bacteriostatic, bactericidal, fungistatic, and fungicidal activity against plant and human pathogens is desired, but the invention will preferable be used for treating seeds, plants and fruits to prevent or control attack by fungi. One of the advantages of the compounds described above is that they may be used under controlling conditions without being toxic to the treated plants. The compounds will be useful in controlling numerous fungi affecting fruits, vegetables and crop plants, including powdery mildews, late blight, damping-off, organisms, apple scab and other fruit diseases, rusts, bacterial plant diseases, etc.

The procedure which will be used for applying the compositions of the invention to plants will be in accord with the usual practices known in the art. Since the active compounds have limited water solubility they will usually be applied to the plant as an aqueous dispersion, which is preferably obtained from a wettable powder. In a preferred embodiment of the invention a concentrate of the active agent together with a carrier and containing a surfactant will be manufactured and sold as an article of commerce. Preferably, this concentrate will be in the form of a wettable powder made simply by blending the active agent with a carrier such as clay or other finely-divided or particulate inert matter, e.g. attapulgite, bentonite, fullers' earth, and the like. As a surfactant there may be used one or more of the many surface active agents generally employed such as polyalkylene oxide, a lignin sulfonate, or the various other cationic, anionic and nonionic surfactants available for such purposes. Generally, the wettable powder concentrate will contain from about 5 to about 90% by weight of the active agent, the balance being the carrier and the surfactant.

Alternatively, the active agents may be formulated in organic solvent systems as a solution or emulsion concentrate containing from 5 to about 90% by weight of active agent and the organic solvent system dispersed in water just prior to use. Generally, the organic material will be an organic hydrocarbon solvent such as xylene, toluene, etc., but other solvent systems such as ketones (methyl ethyl ketone, acetone, etc.) aliphatic amides such as dimethylformamide, dimethylacetamide, ketoalcohols (diacetone alcohol) and the like may also be used.

The rate of application of the fungicides onto the plant, flower, seed or other crops to be treated will vary from about 0.25 lb./100 gallons to 10 lbs./100 gallons of active material. Preferably and for economic reasons, the rate of application will be from 0.25 lb. to 3 lbs. per acre or from 0.25 lb. to 2 pounds per gallon for tree applications. Application is made in the usual manner by spraying an aqueous dispersion of the agent onto the plant and treatment in this manner enables control of the pathogen to be obtained.

In order to more fully illustrate the invention the following examples are given:

EXAMPLE 1.—FORMULATION OF ACTIVE AGENT

(a) Aqueous dispersion

Ten parts by weight of 2-amylsulfonyl-6-dimethyl-aminobenzothiazole and 90 parts by weight of water are air milled in the presence of an alkyl urea polyether alcohol surfactant until a stable dispersion is abtained.

(b) Wettable powder

| Ingredients: | Percent by wt. |
|---|---|
| 2-methylsulfonyl-6-aminobenzothiazole | 50 |
| Surfactants: | |
| Sodium lignosulfonate ("Marasperse") | 2 |
| Alkylphenoxypoly(ethyleneoxyethanol) ("Igepal" RC–760) | 2 |
| Carrier: | |
| Attapulgite | 46 |

The following table indicates the compounds evaluated in the following examples and also indicates code numbers for the compounds:

Active agent:

$$R'\text{-}\underset{S}{\overset{N}{\bigcirc}}\text{-}SO_2R$$

| R | R' | Code No. |
|---|---|---|
| $CH_3$ | H | 1 |
| $CH_3$ | $6\text{-}NO_2$ | 2 |
| $n\text{-}C_4H_9$ | H | 3 |
| $t\text{-}C_4H_9$ | H | 4 |
| $C_5H_{11}$ | H | 5 |
| $C_7H_{15}$ | H | 6 |
| $CH_3$ | $6\text{-}NH_2$ | 7 |
| $C_4H_9$ | $6\text{-}NO_2$ | 8 |
| $CH_3$ | $5\text{-}CF_3$ | 9 |
| $CH_3$ | $5\text{-}Cl$ | 10 |

EXAMPLE 2.—ACTIVITY AGAINST POWDERY MILDEW

Pinto bean plants in pots are sprayed with a water emulsion of the active agent to deposit the agent at various concentrations. Powdery mildew (*Erysiphe polygoni*) cultures maintained on other plants are then used to innoculate the treated plants. Percent control is obtained by visual comparisons with a check test using none of the active agent.

The following table indicates the data and the results of the tests:

TABLE A

| Agent (Code No.) | Concentration, p.p.m. | Percent control of powdery mildew (*Erysiphe polygoni*) |
|---|---|---|
| 1 | 1,250 | 92 |
| 1 | 1,250 | 95 |
| 3 | 2,500 | 100 |
| 3 | 5,000 | 95 |
| 6 | 2,500 | 97 |
| 6 | 1,000 | 100 |
| 9 | | |

EXAMPLE 3.—ACTIVITY AGAINST LATE BLIGHT

Three to four week old Bonnie Best tomato seedlings are sprayed with a water emulsion of the active agent and innoculated (after drying) with a suspension of zoospores (produced from a sporangia from lima bean agar cultures of *Phytophthora infestans*). Counts are made of spots of late blight infection when they appear and control is expressed as percentage of check.

The following table indicates the data and results of the tests:

TABLE B

| Agent (Code No.) | Concentration, p.p.m. | Percent control of late blight |
|---|---|---|
| 1 | 80 | 100 |
| 1 | 50 | 83 |
| 2 | 50 | 99 |
| 2 | 25 | 99 |
| 3 | 5,000 | 90 |
| 4 | 640 | 99 |
| 5 | 50 | 90 |
| 6 | 650 | 90 |
| 6 | 160 | 100 |
| 6 | 40 | 97 |
| 7 | 500 | 100 |
| 8 | 100 | 100 |
| 8 | 50 | 99 |
| 8 | 25 | 100 |
| 9 | 1,000 | 100 |
| 9 | 200 | 95 |
| 9 | 40 | 88 |
| 10 | 500 | 100 |
| 10 | 200 | 97 |
| 10 | 40 | 93 |

EXAMPLE 4.—SPORE GERMINATION ACTIVITY

Spores from agar cultures and active agent are mixed together in a drop of water contained in wax rings on 1 x 3 inch glass slides. Rating indicates at what concentration germination occurs after 24 hours: 3+=none at 1 p.p.m., 3=1 to 10 p.p.m., 2=10 to 100 p.p.m., 1=100 to 1,000 p.p.m., 0=1,000 p.p.m.

Results are shown in the following table:

TABLE C

| Agent (Code No.) | *Monilinia fructicola* | *Alternaria brassicola* | *Stemphylium sarinaeforme* | *Glomerella cingulata* |
|---|---|---|---|---|
| 1 | 3 | 3 | 2 | 3 |
| 2 | 3+ | 3+ | 3+ | 3+ |
| 3 | 2 | 1 | | 1 |
| 5 | 1 | 2 | 0 | 2 |
| 6 | 1 | 1 | 0 | 1 |
| 7 | 1 | 1 | | 1 |
| 8 | 3+ | 3+ | | 3+ |

EXAMPLE 5.—SEEDLING DAMPING-OFF CONTROL

Tests are conducted on soil infested with damping-off organisms. The amount of compound required as an emulsifiable concentrate to give the indicated rate per acre is mixed with clay and then mixed with seeds to be planted. The remainder of this mixture, which does not cling to the seed, is mixed with soil and used to cover the seeds. The following table indicates the test results:

TABLE D

| Active agent Code No. | Rate | Crop | Percent stand Treated | Percent stand Untreated |
|---|---|---|---|---|
| 2 | 10 lbs./acre | Cotton | 80 | 45 |
| | | Cucumber | 90 | 55 |
| | | Sugar beets | 83 | 42 |

EXAMPLE 6.—ACTIVITY AGAINST BEAN RUST

Pinto bean plants were sprayed with the active agent similar to Example 2. After drying, the plants are sprayed with a water suspension of urediospores of *Uromyces phaseoli* and immediately placed in a moist chamber and held at 15 to 20° C. for 24 hours. Results in five days are expressed as percent control by visual comparison with an untreated check.

The following table indicates data and results of these tests:

TABLE E

| Agent (Code No.) | Concentration, p.p.m. | Percent control |
|---|---|---|
| 1 | 500 | 100 |
| 1 | 100 | 5 |
| 2 | 500 | 95 |
| 2 | 200 | 100 |
| 2 | 50 | 98 |
| 3 | 500 | 81 |
| 4 | 500 | 47 |
| 5 | 500 | 85 |
| 6 | 320 | 87 |
| 6 | 80 | 59 |
| 7 | 500 | 76 |
| 8 | 500 | 97 |
| 8 | 100 | 95 |
| 8 | 20 | 95 |
| 9 | 100 | 100 |
| 9 | 20 | 90 |
| 10 | 500 | 99 |
| 10 | 100 | 96 |

EXAMPLE 7.—ACTIVITY AGAINST PLANT BACTERIA

The active agent as a water emulsion is streaked across the surface of nutrient agar seeded with *Xanthomonas pruni* and inhibition of growth is recorded in 24 hours.

TABLE F

| Agent (Code No.): | Concentration, p.p.m. | Growth inhibition |
|---|---|---|
| 1 | 2,000 | Slight. |
| 2 | 2,000 | Complete. |
| 2 | 200 | Do. |
| 6 | 2,000 | Slight. |
| 8 | 2,000 | Complete. |
| 8 | 200 | Do. |

EXAMPLE 8.—ACTIVITY AGAINST PLANT BACTERIA

A drop of a water emulsion of the agent is placed on a 6 mm. filter disc and allowed to dry. Treated discs are placed on the surface of nutrient agar seeded with *Xanthomonas pruni* and *Erwinia amylovora*. The diameter of the inhibition zone (minus the disc) is measured in 24 hours.

The following table indicates data and results of these tests:

TABLE G

| | X. pruni | | | | E. amylovora | | | |
|---|---|---|---|---|---|---|---|---|
| | p.p.m. | | | | p.p.m. | | | |
| | 2,000 | 200 | 50 | 20 | 2,000 | 200 | 50 | 20 |
| Agent (Code No.): | | | | | | | | |
| 2 | 14 | 9 | 8 | 6 | 9 | 8 | 3 | 1 |
| 8 | 5 | 2 | 0 | 0 | 3 | 1 | 0 | 0 |

In addition to the above exemplified compounds the following compounds show similar fungicidal and bacterial activity:

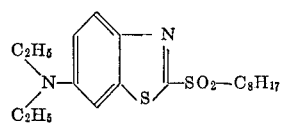

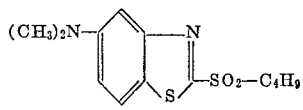

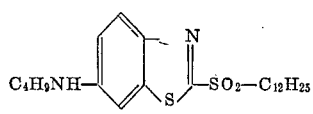

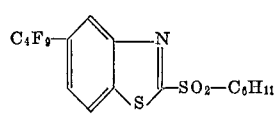

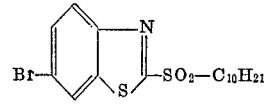

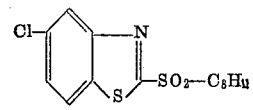

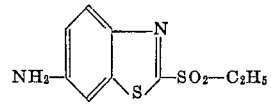

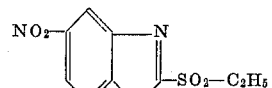

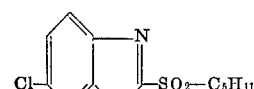

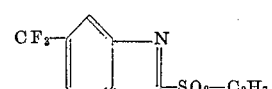

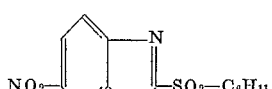

EXAMPLE 9

Following the test procedures described above, the compound of structure:

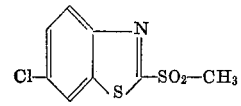

is evaluated and the following data obtained:

Spore germination activity

*Monilinia fructicola* _____ 3
*Alternaria brassicola* _____ 3
*Glomerella cingulate* _____ 3

Late blight

| Concentration, p.p.m.: | Percent control |
|---|---|
| 1000 | 99 |
| 200 | 90–97 |
| 50 | 93 |

Bean rust

| Concentration, p.p.m.: | Percent control |
|---|---|
| 500 | 99 |
| 100 | 96 |
| 20 | 85 |

EXAMPLE 10

Tests are made against ten organisms by inoculating agar media containing the test compounds at various concentrations with 7 mm. diameter plugs taken from 10 day old cultures. The data obtained after 48 hours incubation is shown in the following Table H:

TABLE H.—GROWTH AFTER 48 HOURS OF TEN ORGANISMS ON MEDIA CONTAINING VARIOUS CONCENTRATIONS OF TEST AGENTS

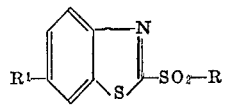

Agent tested:

| Organism | R CH₃ | R' Cl | R CH₃ | R' NO₂ | R C₄H₉, 500 | 100 | R' NO₂, 20 |
|---|---|---|---|---|---|---|---|
| | 20 p.p.m. | | 20 p.p.m. | | p.p.m. | p.p.m. | p.p.m. |
| Rhizopus stolonifer | 0 | | 0 | | 0 | + | + |
| Aphanomyces euteiches | 0 | | 0 | | 0 | 0 | 0 |
| Botrytis cinerea | 0 | | 0 | | 0 | + | + |
| Penicillium expansum | 0 | | 0 | | 0 | + | + |
| Fusarium oxysporum f. cucumcinum | 0 | | 0 | | + | + | + |
| Fusarium roseum | 0 | | 0 | | − | + | + |
| Pythium ultima | 0 | | 0 | | 0 | 0 | 0 |
| Monilinia fructicola | 0 | | 0 | | 0 | 0 | + |
| Alternaria brassicola | 0 | | 0 | | − | + | + |
| Glomerella cingulata | 0 | | 0 | | − | + | + |
| Legend | 0 | | 0 | | − | + | + |

NOTE:
0 = No growth.
− = Growth on inoculum plug only.
+ = Growth.

EXAMPLE 11

The active agents as described by the above structural formula are evaluated and found active against numerous bacteria and fungi pathogenic to humans; e.g. *Bacillus subtilis*, *Staphylococcus aureau*, *Escherichia coli*, *Staphytococcus typhosa*, *Salmonella typhosa*, *Staphyococcus epidermidas*, and *Candida albicans*. The following test procedures and data illustrate this activity.

(A) Agar dilution method

One-half of the area in the Petri dish is covered with agar which contains the germicide at a selected concentration, whereas the other half is covered with an untreated agar. Both the treated and untreated agars are then seeded with bacteria by streaking across the plate. After 48 hours of incubation the plates are examined for any exhibited inhibitory properties of the biostatic agent against the test bacteria. The test data with agent Code No. 2 follows:

| Concentration, p.p.m.: | Staphylococcus aureus (ATCC No. 6538) | Escherichia coli (ATCC No. 11229) |
|---|---|---|
| 1 | +4 | +4 |
| 10 | +3 | +4 |
| 20 | +3 | +3 |
| 25 | 0 | +2 |
| 30 | 0 | ± |
| 50 | 0 | 0 |
| 100 | 0 | 0 |
| 300 | 0 | 0 |
| 500 | 0 | 0 |
| Endpoint | 25 p.p.m. | >30 p.p.m. |
| Acetone Control: | | |
| 25 | +4 | +4 |
| 50 | +4 | +4 |
| 100 | +4 | +4 |
| 500 | +4 | +4 |
| 1,000 | +4 | +4 |

Legend Note: 0 = No growth; ± = trace growth; 1 to 4 indicates increasing amounts of growth.

(B) Minimal inhibitory concentration

Using the tube dilution method against *Candida albicans*, three-fold dilutions are used from 33 to 0.033 mcg./ml. to determine the minimal inhibitory concentration of active agent code No. 2. Tubes were read after 24 and 72 hours incubation. At 1.0 mcq./ml. no growth was observed at 24 hours, but growth began in 72 hours. This activity is comparable to that of Nystatin, a commercial antifungal agent. Upon subculturing the maximal concentration it was found that the minimal inhibotory concentration was 3.3 mcg./ml. and was cidal in nature.

Likewise, 2 - methylsulfonyl - 5 - trifluoromethylbenzothiazole was active against *Staphylococcus aureus* 50 p.p.m.), *Candida albicans* (100 p.p.m.), *Erwinia carotovora* (5 p.p.m.), *Fusarium roseum* (5 p.p.m), *Trichophyton mentagrophytes* (100 p.p.m.), *Pullularia pullulans* (100 p.p.m.), *Aspergillus niger* (100 p.p.m.) and *Chaetomium globossum* (5 p.p.m.).

EXAMPLE 12

Six- to one-year old actively growing apple seedlings are sprayed on both top and bottom leaf surfaces at the appropriate concentrations of active agents in a 25% wettable powder formulation. The plants are allowed to dry for four hours and placed in a moist chamber for 12 hours to simulate weathering. Spores of apple scab *Venturia inaequalis*) are atomized from an aqueous suspension onto the tops and bottom of the apple tree leaves and held in the moist chamber at 20° C. for 36 to 48 hours. Counts are made on three leaves per plant with scab and control expressed as percent of check.

TABLE I

| Agent (Code No.): | Concentration, p.p.m. | Apple scab control |
|---|---|---|
| 9 | 1,000 | 100 |
| 9 | 200 | 99 |
| 10 | 1,000 | 92 |
| 10 | 200 | 60 |

When dwarf apple trees are sprayed with a wettable powder formulation containing 1.5 pounds of active agent per 100 gallons of liquid, very effective control of apple scab is obtained with agents code No. 2 and 8.

EXAMPLE 13.—CONTROL OF APPLE MILDEW

The agent of Code No. 10 formulated in xylene is diluted with distilled water to the desired concentration and apple seedlings are sprayed until run-off. After drying, the plants are dusted with spores of *Podosphaera leucotricha* grown on infected plants. After ten days, average percent control is reported. At 1000 p.p.m., 100% control is obtained, and at 200 p.p.m., the control is 92.5%.

EXAMPLE 14.—CONTROL OF WHEAT RUST

The formulated agent is diluted with distilled water to obtain the desired concentrations and six-day old potted Seneca wheat plants are sprayed with an atomizer to apply the test agent. Ten ml. of diluted compound is used to treat each pot.

Urediospores of *Puccinia rocondita* are washed from previously infected leaves with distilled water containing 125 p.p.m. Ivory soap. This spore suspension is placed in a small vial and the capped vial is placed on a ball mill. After one hour the liquid is removed from the washed spores and now soap water is added to obtain a spore suspension containing 100,000 spores per ml.

After the treated plants have dried, about 50 ml. of the spore suspension is used to spray inoculate every ten pots. Immediately after inoculation the plants are placed in a high humidity chamber and kept at room temperature for another six days when infection readings are made.

Test results follow:

| Agent (Code No.): | Concentration, p.p.m. | Percent control |
|---|---|---|
| 9 | 500 | 100 |
| 9 | 100 | 90 |
| 10 | 500 | 100 |
| 10 | 100 | 80 |

EXAMPLE 15.—AOAC FUNGICIDAL TEST

Five ml. portions of each fungicidal concentration are inoculated with 0.5 ml. spore suspension of the test culture. From this mixture samples are transferred after 5, 10, and 15 minute intervals into dextrose broth subculture tubes. After 10 days incubation the tubes are examined for the presence or absence of fungal growth. The highest dilution that kills spores within 10 minutes is commonly considered as the highest dilution that could be expected to disinfect an inanimate surface contaminated with pathogenic fungi. The data obtained with 2-methylsulfonyl-6-nitrobenzothiazole follow:

FUNGISTATIC ACTIVITY.—AGAR DILUTION METHOD WITH 2-METHYLSULFONYL-6-NITROBENZOTHIAZOLE

| | Aspergillus niger (ATCC No. 6275) | Trichophyton interdigitale (ATCC No. 9533) |
|---|---|---|
| Concentration, p.p.m.: | | |
| 1 | +4 | +4 |
| 10 | ± | ± |
| 25 | 0 | 0 |
| 50 | 0 | 0 |
| 100 | 0 | 0 |
| 300 | 0 | 0 |
| 500 | 0 | 0 |
| Endpoint | 10 p.p.m., 25 p.p.m. | 10 p.p.m. 25 p.p.m. |
| Acetone control: | | |
| 50 | +4 | +4 |
| 100 | +4 | +4 |
| 500 | +3 | +4 |

Legend: 0=No growth; ±=trace growth; 1 to 4 indicates increasing amounts of growth.

We claim:

1. The process of controlling bacteria and fungi which comprises contacting said pathogens with an effective plant bacteria and fungi inhibiting amount of a compound having the structure:

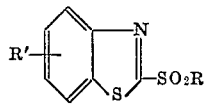

where R is alkyl containing from one to twelve carbon atoms and R' is selected from the group consisting of hydrogen, nitro, halogen, perfluoro lower alkyl, amino and alkylamino containing from 1 to 6 carbon atoms.

2. The process of claim 1 where the active agent is 2-methylsulfonylbenzothiazole.

3. The process of claim 1 where the active agent is 2-methylsulfonyl-6-nitrobenzothiazole.

4. The process of claim 1 where the active agent is 2-butylsulfonylbenzothiazole.

5. The process of claim 1 where the active agent is 2-amylsulfonylbenzothiazole.

6. The process of claim 1 where the active agent is 2-heptylsulfonylbenzothiazole.

7. The process of claim 1 where the active agent is 2-butylsulfonyl-6-nitrobenzothiazole.

8. The process of claim 1 where the active agent is 2-methylsulfonyl-6-aminobenzothiazole.

9. The process of claim 1 where the active agent is 2-methylsulfonyl-6-chlorobenzothiazole.

10. the process of claim 1 where the active agent is 2-methylsulfonyl-5-chlorobenzothiazole.

11. The process of claim 1 where the active agent is 2-methylsulfonyl-5-trifluoromethylbenzothiazole.

12 The process for controlling late blight infested plants which comprises contacting said plants with an effective plant bacteria and fungi inhibiting amount of a compound defined in claim 1.

13. A process for controlling apple scab infested apple trees which comprises contacting apple trees with an effective apple scab inhibiting amount of a compound defined in claim 1.

14. A process for controlling fungi which comprises contacting fungi with 2-methylsulfonyl-6-nitrobenzothiazole.

15. The process of claim 14 where the fungi is *Candida albicans*.

References Cited

UNITED STATES PATENTS

| 2,509,454 | 5/1950 | Russell | 260—306 |
| 2,798,066 | 7/1957 | Larive et al. | 260—304 |

ALBERT T. MEYERS, Primary Examiner

D. R. ORE, Assistant Examiner